United States Patent [19]
Ryder

[11] 4,072,534
[45] Feb. 7, 1978

[54] SUPER SULPHATE CEMENT REINFORCED WITH GLASS FIBERS

[75] Inventor: Jack Forrester Ryder, Abbots Langley, England

[73] Assignee: National Research Development Corporation, London, England

[21] Appl. No.: 643,927

[22] Filed: Dec. 23, 1975

[30] Foreign Application Priority Data

Dec. 23, 1974  United Kingdom .............. 55453/74

[51] Int. Cl.$^2$ ................................................ C04B 7/02
[52] U.S. Cl. ...................................... 106/98; 106/50; 106/99; 106/110; 106/117; 106/118; 106/109
[58] Field of Search ............... 106/99, 50, 103, 98, 106/77, 76, 84, 109, 110, 117, 118; 264/333, 299

[56] References Cited

U.S. PATENT DOCUMENTS

| | | | |
|---|---|---|---|
| 3,202,522 | 8/1965 | Yang et al. | 106/99 |
| 3,269,888 | 8/1966 | Yang | 106/99 |
| 3,736,162 | 5/1973 | Chralorsky | 106/99 |
| 3,783,092 | 1/1974 | Majumdar | 106/50 X |
| 3,840,379 | 10/1974 | Wolf | 106/50 |
| 3,852,082 | 12/1974 | Majumdar | 106/99 |
| 3,861,926 | 1/1975 | Irlam et al. | 106/99 X |
| 3,887,386 | 6/1975 | Majumdar | 106/99 |

*Primary Examiner*—Winston A. Douglas
*Assistant Examiner*—John F. Niebling
*Attorney, Agent, or Firm*—Oblon, Fisher, Spivak, McClelland & Maier

[57] ABSTRACT

Glass fiber cementitious composites of improved durability comprise fibers of an alkali-resistant glass containing zirconia or stannia in combination with a supersulphate cement. The invention also includes processes for the production of such composites with particular reference to the production of molded or cast products by a modification in which self-supporting green products are produced at an early stage.

16 Claims, No Drawings

SUPER SULPHATE CEMENT REINFORCED WITH GLASS FIBERS

This invention relates to cementitious composites, and in particular to glass fibre-reinforced cementitious composites.

In recent years a wide range of cementitious materials, such as Portland cement and other types of cement in which the setting and hardening of the material depends on a reaction between calcareous and siliceous materials, have been reinforced with glass fibres. For this purpose it was first necessary to identify suitable criteria and to develop suitable glass fibres capable of withstanding the severely alkaline corrosive conditions which prevail in such materials. A substantial level of alkali resistance is required for the compatability of glass fibres with these materials, and such levels of alkali resistance and glass fibres meeting such requirements have been described, for example, in U.K. Pat. specification Nos. 1,200,732, 1,243,972 and 1,307,357. Thus, for instance, as described in U.K. Pat. specification No. 1,200,732, glasses suitable for the purpose are those which have per se a degree of alkali resistance such that when tested in the form of an abraded fibre of length $2\frac{1}{2}$ inches and diameter from 0.4 to $1.0 \times 10^{-3}$ inches said fibre has a tensile strength of at least 100,000 p.s.i. after treatment with saturated $Ca(OH)_2$ solution at 100° C for 4 hours followed by successive washing at ambient temperature with water then with aqueous hydrochloric acid (1%) for 1 minute, water, acetone, followed by drying, said fibre experiencing not more than 10% reduction in diameter during said test. Preferably the tensile strength of such fibres when tested after the specified treatment is at least 200,000 p.s.i.

It has now been found that the combination of some fibres having such levels of alkali resistance with certain types of cement leads to products having improved long term durability when compared with ordinary Portland cement products reinforced with the same fibres. This is indeed unexpected for the former cements when reinforced with fibres of E-glass, a commercially available low alkali borosilicate glass, give products having no significant difference in long term durability when compared with ordinary Portland cement products reinforced with E-glass fibres. In addition, the compositions of these cements may be varied to make them particularly suitable for use in combination with glass fibres, especially when the products are in a moulded or cast form.

According to the present invention a glass fibre cementitious composite comprises fibres derived from an alkali-resistant glass containing zirconia or stannia in combination with a supersulphate cement.

For the purposes of this Specification a supersulphate cement is one which sets by the hydration reaction of a reactive glassy material with a calcium sulphate activator. Typically the reactive glassy material comprises silica and alumina and usually also calcia, and it is believed that the setting and hardening of the resultant material is associated with the formation of calcium sulpho-aluminates. The reactive glassy material may be a waste material for instance a slag, especially a granulated blast furnace slag.

The calcium sulphate may be present either in a hydrated form e.g. gypsum, $CaSO_4.2H_2O$, partially hydrated from e.g. hemihydrate, $CaSO_4.\frac{1}{2}H_2O$, or anhydrous form e.g. anhydrite, $CaSO_4$, or as a mixture of two or more of these forms. Preferably the cement mix also contains a minor proportion of an alkaline accelerator which for instance may be Portland cement or lime.

The composition of the reactive glassy material may vary widely though usually it will predominantly comprise calcia, silica and alumina generally present in combined form e.g. as calcium alumino-silicates. The glass material may also contain other components, normally present in minor proportions and also usually in combined form e.g. magnesia (MgO), ferrous oxide (FeO), manganese oxide (MnO) and sulphur in the form of sulphides. For the sake of convenience the components of the glassy material are expressed as if they were present as free compounds e.g. oxides, though this may not be the case in practice. A suitable source of reactive glassy material granulated blast furnace slag which is typically prepared by rapidly chilling molten blast furnace slag and thereby imparting reactivity to the material. Blast furnace slag which has not been chilled in this fashion is not usually suitable for use in supersulphate cement. Thus for example granulated blast furnace slags suitable for the production of supersulphate cement may comprise from about 40 to about 50% by weight of calcia, from about 30 to about 40% by weight of silica, and from about 8 to about 18% by weight of alumina. Preferably the granulated blast furnace slag contains at least 13% by weight of alumina. Examples of granulated blast furnace slag compositions which may be used in the production of supersulphate cement are given at page 481 et seq. in "The Chemistry of Cement and Concrete" (Edward Arnold, third edition 1970) by F. M. Lea.

The composition of the supersulphate cement mix may be varied widely in accordance with the properties desired in the final product. Usually, however, the dry cement mix comprises at least 70% by weight of the glassy material e.g. at least 70% and preferably at least 75% by weight of granulated blast furnace slag. A preferred range for the content of the glassy material is from about 80 to about 85% by weight e.g. from 80 to 85% by weight of granulated blast furnace slag. The calcium sulphate component may be present as from about 7 to about 25% by weight of the cement mix. Preferably however, there is less than 20% by weight of calcium sulphate in the cement mix and especially the calcium sulphate content is in the range from about 10 to about 15% by weight of the cement mix e.g. from 10 to 15% by weight of anhydrite, gypsum or hemihydrate. An alkaline accelerator may be present in the cement mix usually at a level of up to about 5% by weight e.g. about 2% by weight of lime or about 5% by weight of Portland cement. Examples of typical supersulphate cement mixes are described in the above-mentioned publication, by F. M. Lea.

The foregoing description includes supersulphate cements which are novel per se and which comprise a calcium sulphate component at least part of which is in the form of the hemihydrate. Typically such novel cements, on addition of water, are subject to an initial first set which is due to the hydration of the hemihydrate ($CaSO_4.2H_2O$) to the dihydrate ($CaSO_42H_2O$), and takes place generally prior to, and is usually separate and distinct from, the supersulphate cement setting reaction.

Thus in a preferred embodiment of the present invention a glass fibre/supersulphate cement composite comprises a calcium sulphate component at least part of which is initially in the form of the hemihydrate. Preferably the level of hemihydrate present in the supersulphate cement mix is such that a self supporting green product is obtained at an early stage as a result of the first set due to the hydration of the hemihydrate. For example the supersulphate cement mix may comprise at least 7% by weight, preferably at least 10% by weight and especially at least 15% by weight of hemihydrate. Advantageously the calcium sulphate component of the supersulphate cement mix may be entirely in the form of the hemihydrate.

The use of cement mixes comprising hemihydrate is particularly applicable to processes of producing glass fibre-reinforced product which involve moulding or casting e.g. the spray suction technique for instance for the production of sheets, or the spin casting technique for instance for the production of pipes. Usually the product is self supporting and may be removed from the mould or cast at an earlier stage than a product derived from a supersulphate cement mix containing no hemihydrate, and preferably may be removed from the cast on completion of the first set due to the hydration of the hemihydrate. For instance the green products may be removed from the mould after a period of only 15 minutes to about 2 hours whereas unmodified supersulphate cement and Portland cement products must be kept in the mould for longer period, up to about 18 to 24 hours.

Advantageously this may allow a higher throughput for a given number of moulds or casts than has hitherto been possible using other cements such as for instance ordinary Portland cement.

The first set may take place in a relatively short period of time e.g. about 10 minutes, and hence for practical considerations the cement mix may include a minor proportion e.g. about 0.1% by weight of the hemihydrate, of a retarder which retards the rate of hydration of the hemihydrate. The retarders which may be employed are typically those which are customarily employed to retard the rate of setting or gypsum plaster e.g. keratin or organic salts such as sodium citrate or sodium tartrate. The amounts of retarder used may be varied in accordance with the required rates for the first set.

The glass fibres which may be used for the reinforcement of cement products according to the present invention are fibres of alkali resistant glasses containing zirconia or stannia. Generally the fibres may contain from about 5 to about 20% by weight of $ZrO_2$ or $SnO_2$, and also the main glass forming component is usually silica preferably present from about 60 to about 80% by weight of the glass. Preferred fibres are fibres of siliceous glasses containing substantial proportions e.g. more than 8% by weight, of $SnO_2$ for instance the stannia containing glass fibres described in U.K. Pat. No. 1,307,357, and also fibres of glass containing more than about 7% by weight of $ZrO_2$ for instance the zirconia containing glass fibres described in Pilkington Brothers Limited's U.K. Pat. No. 1,290,528 or Owens-Corning Fibreglass Corporation's U.S. Pat. No. 3,840,379. The glasses may also contain a network modifier such as an alkali metal oxide or alkaline earth metal oxide or ZnO, usually present from about 10 to about 20% by weight of the glass. More especially, however, products of outstanding properties may be obtained with fibres containing relatively higher proportions of zirconia e.g. at least 6.0 mol.% $ZrO_2$ and preferably at least 9.0 mol.% $ZrO_2$ including glasses based on the system $SiO_2/ZrO_2/Na_2O$ for instance those described in U.K. Pat. No. 1,243,972.

It is also believed that fibres of other glasses having similar levels of alkali resistance i.e. as defined by the aforementioned test, may give rise to supersulphate cement composites of improved long term durability, and combinations of such fibres with supersulphate cement are included within the scope of the present invention. For example, glass fibres which are particularly worthy of note in this respect are alkali resistant glass fibres of the $CaO—Al_2O_3—MgO—SiO_2$ type such as those described in U.K. Pat. No. 1,200,732.

Generally the products of the present invention may be produced by the processes in which fibre reinforced cementitious products have been produced in the past, for instance by the technique described in U.K. Pat. No. 1,200,732, and may be produced in a wide range of physical forms including those forms in which fibre reinforced cementitious products have been produced previously. For example the products may be produced in the form of pipes, boards, sheets and other structures, and in particular the products may be in the form of prefabricated units for use in the construction industry e.g. cladding panels, permanent shuttering, and ducts. Usually from 0.5 to 10% by weight and preferably from 4–6% by weight of fibres are employed, these percentages based on the glass fibre/wet cement mix immediately prior to setting.

Typically the products of the present invention exhibit improved long term durabilities as compared with Portland cement products reinforced with the same fibres. In particular outstanding long term durabilities are obtained when the products are used or stored prior to use in damp conditions, for instance under water.

The invention is further illustrated by the following examples. Example 1 describes the production and testing, under conditions of accelerated ageing, of supersulphate cement products reinforced with alkali-resistant glass fibres, and includes by way of comparison results obtained from an ordinary Portland cement product reinforced with the same alkali-resistant glass fibres.

EXAMPLE 1

Three glass fibre-reinforced boards 9 mm in thickness are prepared by the spray suction technique described by Grimer and Ali ("The strengths of cements reinforced with glass fibres", Magazine of Concrete Research 1969, Vol. 21 (66) March pages 23–30). Each board is prepared using a different cement, (a) an ordinary Portland cement satisfying the requirements of BS12, (b) a proprietary supersulphate cement, supplied by the Frodingham Cement Company, satisfying the requirements of BS 4248, (c) an experimental quick-setting supersulphate cement consisting of 83% by weight of ground granulated blast furnace slag (derived from the same source as the granulated slag used in cement (b)), 15% by weight of a retarded hemihydrate gypsum plaster supplied by British Gypsum Limited and 2% by weight of hydrated lime. "Cem-FIL", a commercially available high zirconia content glass fibre, supplied by Fibreglass Limited, is used for the reinforcement of boards of all three cements, the fibres being in the form of glass fibre roving chopped to a length of 32 mm consisting of bundles of approximately 400 fibres. The proportions of glass fibre, expressed as a percentage of the weight of each board after suction, and the water/cement ratio after suction are shown in Table 1.

TABLE 1

DETAILS OF TEST BOARDS

| Board | Cement | Glass content % of sucked board | Water/cement ratio after suction |
|---|---|---|---|
| a | Ordinary Portland | 5.2 | 0.27 |
| b | Commercial supersulphate | 5.1 | 0.26 |
| c | Quick-setting supersulphate | 4.9 | 0.30 |

After preparation the 9 mm thick boards are cut into specimens 150 mm × 50 mm in size and are stored for an initial period of 28 days in water at 20° C after which the flexural and impact strength of specimens of each board are tested using the methods described by Grimer and Ali in the above-mentioned publication. The remaining specimens are thereafter stored in water at 60° C the flexural and impact strengths of specimens of each board being tested as above after intervals of 5, 10, 20, 30 and 60 days from commencement of storage. The effects of the accelerated ageing in water at 60° C, on the flexural and impact strengths of specimens cut from each board are shown in Table 2. The results obtained for the first set of measurements i.e. after the intial period of storage for 28 days in water at 20° C, are designated as 0 days in water at 60° C in Table 2.

TABLE 2

THE EFFECT OF ACCELERATED AGEING, IN WATER AT 60° C, ON THE STRENGTH OF GRC MADE WITH VARIOUS CEMENTS

| Property | GRC test board | No. of days in water at 60° C | | | | | |
|---|---|---|---|---|---|---|---|
| | | 0 | 5 | 10 | 20 | 30 | 60 |
| Flexural strength (MN/m$^2$) | a | 47.1 | 29.9 | 22.9 | 17.8 | 15.9 | 15.7 |
| | b | 43.9 | 43.8 | 41.3 | 35.5 | 32.5 | 27.7 |
| | c | 35.3 | 37.0 | 32.3 | 28.9 | 27.5 | |
| Impact strength N mm/mm$^2$ | a | 21.2 | 8.4 | 5.7 | 3.5 | 3.1 | 2.0 |
| | b | 28.7 | 23.3 | 18.3 | 14.3 | 8.6 | 6.9 |
| | c | 24.1 | 18.3 | 13.3 | 12.0 | 7.3 | |

Example 2 describes long term testing of alkali-resistant glass fibre reinforced supersulphate cement products stored at normal temperatures under two different storage regimes, and for the purposes of comparison includes results obtained for Portland cement and Portland blastfurnace cement products reinforced with the same alkali-resistant glass fibres stored under the same conditions.

EXAMPLE 2

Commercial supersulphate cement, quick-setting supersulphate cement and Portland cement boards and in addition a Portland blastfurnace cement board are prepared by the spray suction technique as described in Example 1. "Cem-FIL" glass fibres are used for the reinforcement of boards of all four cements. The boards are cut into specimens as in Example 1 and the specimens stored either in water at 20° C or in air under normal weathering conditions. After various periods of storage up to 1 year the flexural strengths and impact strengths of specimens of each board from both of the storage regimes are measured as in Example 1. The flexural strengths are measured in terms of the ultimate strength and strength of LOP (limit of proportionality of the load deflection curve) and the results obtained are given in Table 3 and Table 4 below.

Table 3

EFFECT OF AGEING IN WATER AT 20° C UPON THE FLEXURAL STRENGTH OF "Cem-FIL" GRC MADE WITH VARIOUS CEMENTS.

| Flexural Strength | Cement | No. of days in water at 20° C | | | |
|---|---|---|---|---|---|
| | | 7 | 28 | 182 | 365 |
| Ultimate Strength MN/m$^2$ | Commercial supersulphate | 27.4 | 39.75 | 40.8 | 42.4 |
| | Quick-setting supersulphate | 28.6 | 35.4 | 39.9 | 39.8 |
| | Ordinary Portland | 40.0 | 43.4 | 34.0 | 24.8 |
| | Portland Blastfurnace | 31.4 | 37.6 | 34.5 | 28.8 |
| Strength at LOP MN/m$^2$ | Commercial supersulphate | 8.6 | 10.6 | 13.0 | 17.2 |
| | Quick-setting supersulphate | 10.5 | 13.6 | 14.2 | 16.8 |
| | Ordinary Portland | 16.0 | 16.6 | 16.5 | 18.2 |
| | Portland Blastfurnace | 11.2 | 13.2 | 11.6 | 13.75 |

Table 4

EFFECT OF AGEING UNDER CONDITIONS OF NATURAL WEATHERING UPON THE FLEXURAL STRENGTHS OF "Cem-FIL" GRC MADE WITH VARIOUS CEMENTS.

| Flexural strength | Cement | Days storage- Natural weathering | | | |
|---|---|---|---|---|---|
| | | 7 | 28 | 182 | 365 |
| Ultimate Strength MN/m$^2$ | Commercial supersulphate | 27.5 | 39.8 | 45.2 | 39.5 |
| | Quick-setting supersulphate | 28.5 | 35.4 | 41.0 | 32.5 |
| | Ordinary Portland | 40.0 | 43.4 | 37.8 | 33.1 |
| | Portland Blastfurnace | 31.4 | 37.9 | 37.1 | 29.7 |
| Strength at LOP MN/m$^2$ | Commercial supersulphate | 8.8 | 10.5 | 12.0 | 15.3 |
| | Quick-setting supersulphate | 10.4 | 13.8 | 19.0 | 11.7 |
| | Ordinary Portland | 16.0 | 16.7 | 16.6 | 15.6 |
| | Portland Blastfurnace | 11.3 | 13.6 | 16.0 | 10.8 |

The values obtained for the impact strengths are given in Table 5.

Table 5

EFFECT OF AGEING BOTH IN WATER AT 20° C AND UNDER CONDITIONS OF NATURAL WEATHERING UPON THE IMPACT STRENGTHS OF "Cem-FIL" GRC WITH VARIOUS CEMENTS

| Impact Strength in Nmm/mm$^2$ after given no. of days storage | Cement | No. of days storage | | | |
|---|---|---|---|---|---|
| | | 7 | 28 | 132 | 365 |
| in water at 20° C | Commercial Supersulphate | 29.7 | 26.1 | 24.9 | 20.9 |
| | Quick-setting Supersulphate | 25.4 | 24.1 | 19.7 | 19.6 |
| | Ordinary Portland | | 22.7 | 17.7 | 10.3 |
| | Portland Blastfurnace | 22.7 | 23.0 | 12.6 | 8.5 |
| Natural weathering | Commercial Supersulphate | 29.7 | 26.0 | 26.6 | 26.5 |
| | Quick-setting Supersulphate | 25.4 | 24.2 | 23.4 | 20.6 |
| | Ordinary Portland | | 22.8 | 21.2 | 13.6 |
| | Portland Blastfurnace | 22.8 | 23.1 | 20.2 | 13.0 |

I claim:

1. A process for preparing a glass fibre cementitious composite comprising alkali-resistant glass fibres and supersulphate cement which comprises admixing from 0.5 to 10% by weight, based on the glass fibre/wet cement mix, of said alkali-resistant glass fibres in a supersulphate cement matrix, said alkali-resistant glass fibres comprising from 5 to 20% by weight of a material selected from the class consisting of zirconia and stannia and from 60 to 80% by weight of silica.

2. A process according to claim 1 for the production of moulded or cast cementitious composites, in which the supersulphate cement initially comprises calcium sulphate hemihydrate and green products are removed from the moulds or casts when they become self-supporting as a result of the first set due to the hydration of the hemihydrate.

3. A process according to claim 2, in which the green products are removed from the moulds or casts less than 2 hours after introduction of the glass fibre/wet cement mix thereto.

4. A glass fibre cementitious product comprising supersulphate cement and alkali-resistant glass fibres containing from 0.5 to 10% by weight of fibres based on the glass fibre/wet cement mix, in which said alkali-resistant glass fibres comprise from 5 to 20% by weight of a material selected from the class consisting of zirconia and stannia and from 60 to 80% by weight of silica.

5. The cementitious product of claim 4, wherein the supersulphate cement is derived from the hydraulic setting reaction of a reactive glassy material comprising silica, alumina and calcia, with a calcium sulphate activator.

6. The cementitious product of claim 5, wherein the supersulphate cement is derived from the hydraulic setting reaction of a dry cement mix comprising a calcium sulphate activator at least part of which is in the form of the hemihydrate.

7. The cementitious product of claim 6, wherein the activator is calcium sulfate hemihydrate.

8. The cementitious product of claim 5, wherein the glassy material is granulated blast furnace slag.

9. The cementitious product of claim 8, wherein the granulated blast furnace slag comprises from about 40 to about 50% by weight of calcia, from about 30 to about 40% by weight of silica and from about 8 to about 18% by weight of alumina.

10. The cementitious product of claim 4, wherein the supersulphate cement is derived from the hydraulic setting reaction of a dry cement mix comprising at least 70% by weight of reactive glassy material, from about 7 to about 25% by weight of calcium sulphate activator, and up to about 5% by weight of an alkaline accelerator.

11. The cementitious product of claim 10, wherein the alkaline accelerator is selected from the group consisting of Portland cement and lime.

12. The cementitious product of claim 10 in which the dry cement mix comprises from about 80% to about 85% by weight of reactive glassy material, from about 10 to about 15% by weight of calcium sulphate activator and the balance an accelerator from the group consisting of Portland cement and lime.

13. The cementitious product of claim 12, wherein the calcium sulphate activator comprises at least 7% by weight of calcium sulphate hemihydrate.

14. The cementitious product of claim 4, in which the alkali-resistant siliceous glass fibres contain at least 8% by weight of stannia.

15. The cementitious product of claim 4, in which the alkali-resistant glass fibres contain at least 7% by weight of zirconia.

16. The cementitious product of claim 4, in which the siliceous glass fibres also comprise about 10 to about 20% of a network modifier selected from the group consisting of alkali metal oxide, alkaline earth metal oxide and zinc oxide.

* * * * *